UNITED STATES PATENT OFFICE.

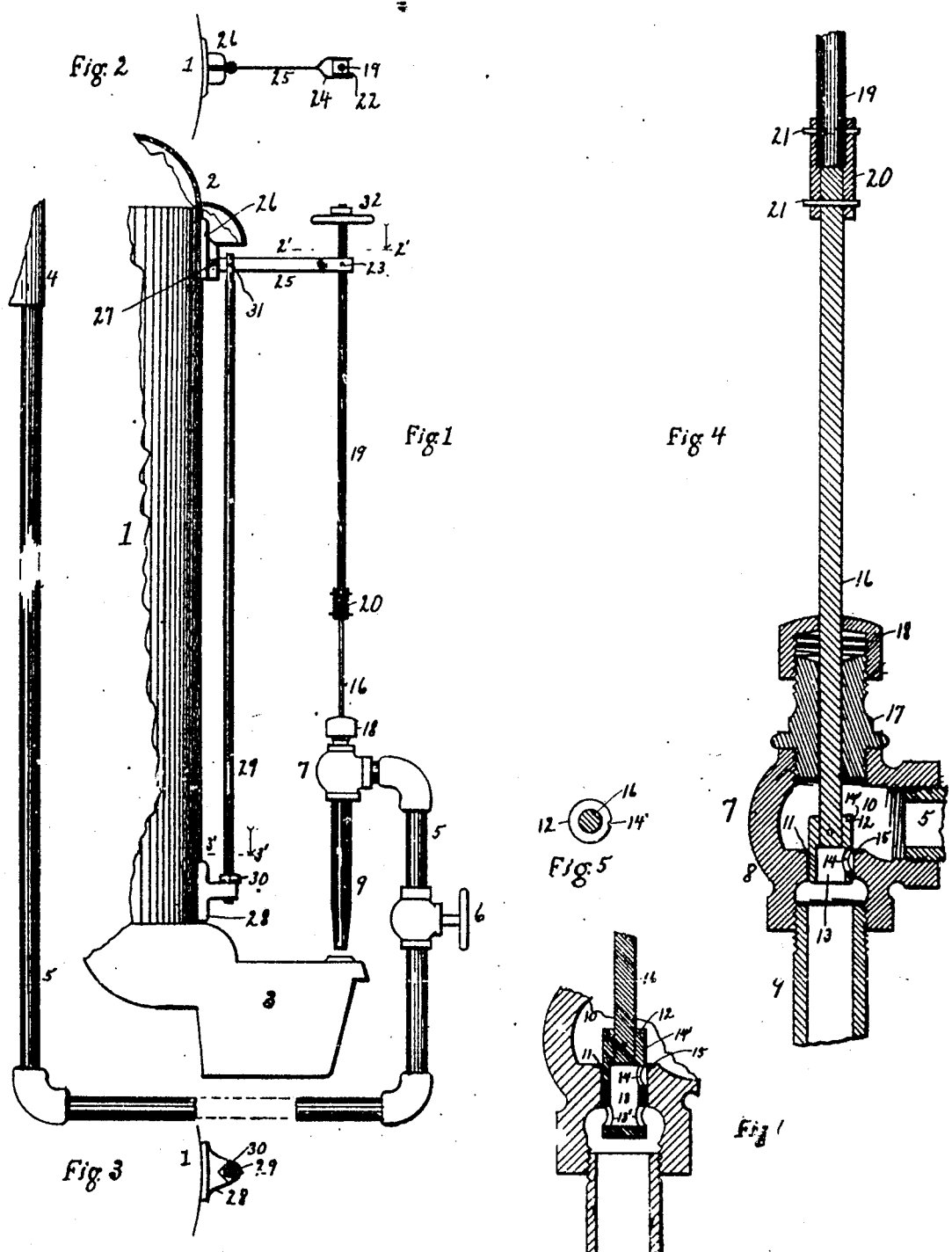

CHARLES FREMONT CURREY, OF TOPEKA, KANSAS, ASSIGNOR OF ONE-HALF TO CHARLES T. SEARS, OF TOPEKA, KANSAS.

REGULATING-VALVE FOR LIQUID-FUEL BURNERS.

No. 867,560.

Specification of Letters Patent.

Patented Oct. 1, 1907.

Application filed March 6, 1906. Serial No. 304,558.

*To all whom it may concern:*

Be it known that I, CHARLES FREMONT CURREY, a citizen of the United States, and a resident of Topeka, in the county of Shawnee and State of Kansas, have invented new and useful Improvements in Regulating-Valves for Liquid-Fuel Burners, of which the following is a specification.

The invention relates to a device for automatically regulating the liquid-fuel supply. This regulation is desired for at least two reasons: first, to maintain a uniform temperature in the room or area to be heated; and second, to prevent the stoppage of the flow of liquid-fuel on account of obstructions lodging in the valve. In the use of crude-oil and its products in the lower stages of refinement, we find various solid and semi-solid impurities; and there is an element of danger, especially where the feed is slow as in stoves and where there is no constant attendant, that a stoppage of the oil-flow may occur on account of the asphaltum and other matter lodging at the minute opening through the valve and putting out the fire by shutting off the fuel supply. The mere extinguishment of the fire is objectionable; and in addition there is the further danger that thereafter the obstruction may become dislodged and the fire-box overflowed with the fuel oil.

My invention consists of a device adapted to be attached to a liquid-fuel burner, the principal elements being a regulating valve and a means for automatically operating the same and so arranged that a reduction of temperature will increase the size of the valve opening and a rise of temperature will cause a reduction of the size of the valve opening. A reduction of temperature may have either or both of two causes. It may be that the surrounding atmosphere gets colder, in which case the increase in the fuel supply will tend to make it warmer and thereby bring the surrounding atmosphere to normal temperature, the corresponding rise in temperature having the effect of again reducing the valve opening to normal. Or it may be that an obstruction in the regulating valve has caused a partial shutting off of the fuel supply; and in such case my device will open up the valve wider, which will permit the obstruction to pass or to be dislodged, and as it passes, a large supply of the oil passes also, which quickly again heats up the burner with the effect of again reducing the valve opening to normal. The regulation by my device is of the fuel supply. It does not regulate the draft as in many other cases, but acts directly upon the fuel supply itself. In the case of an obstruction in the passage, my device removes that obstruction without interfering with the fire; and does not merely afford a factor of safety in completely shutting down the supply when the fire goes out on account of such obstruction. It further serves to maintain a constant temperature. I also provide a means for adjusting the valve to maintain any desired temperature, this being accomplished by the automatic regulation of a constant flow of the liquid-fuel. I make use of the expansion and contraction of metals. Fully and satisfactorily to accomplish the objects of my invention I make use of the expansion and contraction of the wall of the combustion chamber or radiating chamber, or other part affected by the heat from the fire-box, as these parts are perhaps usually the most sensitive to changes in temperature both inside and outside, and available for the purposes of my invention.

The invention consists of the parts, improvements, and combinations herein set forth and claimed.

In the drawings accompanying and forming part of this specification, and in the description thereof, I have shown the invention in its preferred form and have also shown the best mode of applying the principles thereof; but it is to be understood that the invention itself is not confined to these drawings and the description of these drawings, that it may be applied to other uses, that parts and combinations as separately claimed may be used either with or without other devices of similar general nature, and that I contemplate changes in form, proportion, materials, arrangement, the transposition of parts, and the substitution of equivalent members, without departing from the spirit of the invention.

Figure 1 is a view of the apparatus comprising my invention applied to the type of heating stove commonly known as a "round oak" stove, usually comprising a vertically disposed sheet-metal drum for a combustion-chamber and radiating surface. Fig. 2 is a view taken approximately through the line 2′—2′ of Fig. 1; and Fig. 3 is a view taken approximately on the line 3′—3′ of the same figure. Fig. 4 is an enlarged vertical central sectional view of the valve proper in about the position taken in permitting a small flow of oil. Fig. 5 is a top view of the plunger, showing the stem in section. Fig. 6 is an enlarged vertical central sectional view, corresponding in part to Fig. 4, but showing a modified form of regulating valve, the modification being the addition of an arrangement for completely shutting off the oil supply in case of the entire extinguishment of the fire.

Like reference numerals indicate like or corresponding parts throughout the several views.

1 represents a portion of the sheet-metal vertically disposed drum of the stove to which my invention is attached; 2 represents the top casting; and 3 is the fire-box. Should further details be desired as to the construction of this particular type of oil-stove, reference may be had to application Serial No. 292,981, filed December 22, 1905, by Currey and Sears, for improvements in oil-stoves.

4 represents a liquid-fuel tank and 5 is the supply pipe leading therefrom.

6 is an ordinary globe valve or cut-off cock, by which the fuel supply may be positively controlled by hand.

7 is the regulating valve, shown in detail in Fig. 4 and now to be described.

8 is the housing, 5 is the inlet pipe, and 9 is the outlet pipe.

10 is the valve chamber, and 11 is the opening from the chamber to the outlet pipe 9. The upper edge is cut smoothly and squarely, 15, so as to form an even and clear cut shoulder.

12 is the plunger fitting movably in the opening or valve-seat 11; it has a hole 13 extending from the bottom upwards and a port 14 from said opening out through the side. By lowering or raising the plunger, the passage from chamber 10 into outlet 9, through port 14 and hole 13 may be diminished or increased. Plunger 12 is secured to the lower end of a rod or stem 16 which extends up through the stuffing-box 17 and cap 18 (between which two elements may be placed any suitable packing material). The stem 16 may be connected with a rod 19, which forms a continuation thereof, by a coupling sleeve 20 and pins 21, 21. The upper end of rod 19 is threaded and passes through the nut 22 which is suspended on trunnions 23, 23 in the bifurcated end 24 of the lever 25 which is pivoted at its other end to the bracket 26, as by a pin 27. The rod 19 is provided with a wheel handle 32, by which it may be manually raised or lowered. The bracket 26 is secured to the upper part of the sheet-metal drum, as by riveting it thereto; another bracket 28 is riveted to the lower part of the drum; and a rod 29 is fastened to the lower bracket, a jam nut 30 serving to hold it secure. The upper end of the rod 29 is pivoted to the lever 25 by a pin 31 and rather close to the pin 27. The rod 29 should be rather heavy so as not to be readily responsive to variations in the temperature, and stands out from the drum. On the other hand, however, the sheet-metal of the drum being quite thin is readily responsive to such variations, either from within as by variations in the fuel-supply, or from the outside, as by the changes in the surrounding atmosphere. These variations do not, however, as above stated, readily affect the heavy rod 29 which remains practically of the same length.

It will now be understood that, the parts being in about the positions shown in the drawings, should the outside atmosphere become colder, it will cause the sheet metal of the drum to contract, although not appreciably affecting the rod 29; and this causes the outer end of lever 25 to be raised, thereby lifting rod 19 and with it the plunger 12 and increasing the opening through the port 14. This permits a larger supply of oil to pass through the valve to the burner, increases the combustion, and by a contrary action, again reduces the valve opening and restores the temperature to normal. Again, in case the reduction of temperature is caused by a diminution of heat in the combustion-chamber resulting from a stoppage in the valve, as by asphaltum or other substance lodging at the opening, the sheet-metal will likewise contract and similarly lift rod 19 and plunger 12 until the obstruction is dislodged, after which the flow and temperature will be similarly restored to normal. This dislodgment of the obstruction is an important feature of my invention, as I know of no other apparatus or regulator adapted for this purpose. By locating the pins 27 and 31 quite close together, we gain a comparatively long travel with the rod 19 and plunger 12. In about the relative proportions shown in the drawings, the plunger will travel from its position therein shown at a normal temperature, to a position with the entire port 14 above the valve seat 15 when the stove is cold. The valve 6 may be operated by hand to positively control the flow, as when starting and stopping the fire; but when the fire is once well under way, the valve 6 may be opened up wide, and the valve 7 adjusted to any desired flow or temperature by the handle 32. Should the stove be giving off more heat than is desired, the rod 19 should be screwed down to reduce the opening through the regulating valve; should it be not giving off enough heat, the valve should be screwed up. But at whatever adjustment it is set, the desired flow and temperature will be maintained automatically. Although I have shown the brackets 26 and 28 as secured respectively to the top and bottom of the sheet-metal drum, it is now quite clear that the purpose is to secure them at any suitable places so as to be properly spaced apart, and so that they will move to and from each other by the contraction and expansion of the sheet-metal drum. In order that there shall be no complete shutting off of the fuel supply by reason of the plunger being depressed too far, either by the automatic action thereof or by hand, I provide a groove 14' on the face of the plunger extending from the port 14 upwards.

In the modified form shown in Fig. 6, the plunger is a little longer, the bottom is plugged, and side openings 13', 13' are provided for the passage of the oil and so arranged that when the port 14 is entirely above the valve seat 15, the holes 13', 13', are entirely closed by the valve seat 11. The purpose is that in case of the entire extinguishment of the fire, the valve will, by the cooling of the stove, become entirely closed, thus providing a factor of safety, even in the case of the almost impossible event of the fire going out entirely.

What I claim is:

1. In a liquid-fuel burner, the combination of a thermostatic device arranged to be acted upon directly by the flame of the burner whereby it is readily responsive to variations in the temperature of the combustion chamber, a fuel-supply pipe, and a regulating valve therein automatically controlled by said device.

2. In a liquid-fuel burner, the combination of a thermostatic device arranged to be acted upon directly by the flame of the burner whereby it is readily responsive to variations in the temperature of the combustion chamber, a fuel-supply pipe, and a regulating valve therein, automatically controlled by said device so as to increase the size of the valve opening when the temperature is lowered and to reduce the size of said opening when the temperature is raised.

3. In a liquid-fuel burner, the combination of a thermostatic device arranged to be acted upon directly by the flame of the burner whereby it is readily responsive to variations in the temperature of the combustion chamber, a fuel-supply pipe, and a regulating valve therein automatically controlled by said device so as to increase the size of the valve opening when the temperature is lowered and to reduce the size of said opening when the temperature is raised, together with a cut-off cock and means for manually adjusting the regulating valve.

4. In a liquid-fuel burner, the combination with the wall of a heating or combustion chamber, said wall being readily responsive to changes of temperature, a fire-box, a fuel-supply pipe, and a regulating valve therein, of a rod connected with said wall and not readily responsive to changes of temperature, and a device operable by the relative expansion and contraction of said wall and said rod and connected with the regulating valve.

5. In a liquid-fuel burner, the combination with a combustion or heating chamber having a wall adapted to contract and expand on changes of temperature, a fire-box, a fuel-supply pipe, and a regulating valve therein, of a device connected with the combustion or heating chamber and operable by the expansion and contraction thereof caused by variations in the temperature, said device being connected to said regulating valve so as to increase the size of the valve opening in case of contraction and to reduce the size thereof in case of expansion.

6. In a liquid-fuel burner, the combination with a combustion or heating chamber having a metallic wall readily responsive to changes in the temperature of the combustion chamber, of a jointed rod connected with two places on said wall and not being readily responsive to such changes of temperature, a fire-box, a fuel-supply pipe and a regulating valve therein, and connecting means between the rod and the regulating valve whereby said valve is controlled by the expansion and contraction of said wall.

7. The combination with a liquid-fuel stove having a sheet-metal combustion or heating chamber with a wall readily responsive to changes in the temperature of the combustion chamber, of a bracket at the top and another at the bottom, a heavy rod secured to one of the brackets and not readily responsive to such changes of temperature, a lever secured to the other and to said rod, a fuel-supply pipe, and a regulating valve controlled by said lever.

8. The combination with a liquid-fuel stove having a sheet-metal combustion or heating chamber with a wall readily responsive to changes in the temperature of the combustion chamber, of a bracket at the top and another at the bottom, a heavy rod not readily responsive to such changes of temperature and secured to one of the brackets and a lever secured to the other and to said rod, a fuel-supply pipe, a regulating valve controlled by said lever and means for controlling said regulating valve manually.

9. The combination with a liquid-fuel stove having a sheet-metal combustion or radiating chamber with a wall readily responsive to changes in the temperature of the combustion chamber, of a heavy rod not readily responsive to such changes of temperature and a lever secured at places spaced apart on said chamber and pivoted to each other, a fuel-supply pipe, a regulating valve controlled automatically by said lever, a cut-off cock and means for controlling said regulating valve manually.

10. The combination with a stove having walls which are readily responsive to variations in temperature inside and outside thereof, a fuel-supply pipe and a regulating valve therein, a device not so responsive and means connecting the wall and the device and the regulating valve for controlling the valve by the expansion and contraction of the wall.

11. The combination with a stove having sheet-metal walls readily responsive to changes in the temperature of the combustion chamber, a fuel-supply pipe, a cut-off cock and a regulating valve, a rod less readily responsive to such changes of temperature and a lever outside of the stove and secured to places spaced apart on said wall and said rod and said lever being pivoted to each other and operably connected with said regulating valve so that the expansion of the wall will reduce the valve opening and the contraction will increase it.

12. The combination with a stove having a sheet-metal wall readily responsive to changes in the temperature of the combustion chamber, a fuel-supply pipe, a cut-off cock, and a regulating valve, of a heavy rod less readily responsive to such changes of temperature and secured to the outside of the stove, a lever also secured to said stove, the places of attachment of said lever and of said rod being spaced apart, said rod and lever being pivoted together, a nut carried in trunnions by said lever, said regulating valve having its stem threaded and extending through the nut and provided with a handle.

13. The combination with a liquid-fuel burner and a combustion or radiating chamber having a thin sheet-metal wall between said chamber and the outside area to be heated whereby said wall is quickly responsive, by expansion and contraction, to variations in the temperature both inside and outside said combustion chamber; a liquid-fuel supply pipe and a regulating valve in said pipe; and connecting mechanism between said wall and said valve whereby said valve is actuated by such expansion and contraction.

14. The combination with a liquid-fuel burner and a combustion or radiating chamber having a thin sheet-metal wall between said chamber and the outside area to be heated whereby said wall is quickly responsive, by expansion and contraction, to variations in the temperature both inside said chamber and in the outside area; a liquid-fuel supply pipe for the burner; and a regulating valve in said pipe actuated by the expansion and contraction of said wall.

15. The combination with a liquid-fuel burner and a combustion or radiating chamber therefor having a thin sheet-metal wall between said chamber and the area to be heated, said wall being exposed to the temperatures both of said chamber and of said area, whereby said wall is readily responsive, by contraction and expansion, to variations in the temperatures both of said chamber and of said area; a liquid-fuel supply pipe for the burner; and a regulating valve in said pipe actuated by the said contraction and expansion of said wall.

16. The combination with a liquid-fuel burner and a combustion or radiating chamber therefor having a thin sheet-metal wall between said chamber and the area to be heated, said wall being exposed to the temperatures both of said chamber and of said area, whereby said wall is readily responsive, by contraction and expansion, to variations in the temperatures both of said chamber and of said area; a fulcrum-rod secured to said wall said rod not being readily responsive to such changes of temperature; a lever pivoted to said wall at a point spaced apart from the place at which the fulcrum-rod is secured, said rod and lever being pivoted together so that the lever is actuated by the contraction and expansion of said wall; a liquid-fuel supply pipe for the burner; a cut-off cock and a regulating valve for the supply pipe; a connecting element between the lever and the regulating valve whereby the valve is actuated by the lever; and means for manually adjusting the valve.

17. The combination with a liquid-fuel burner and a combustion chamber therefor; a liquid-fuel supply pipe for the burner; and a regulating valve in said pipe; of a thermostatic device directly actuated by the variations in temperature within the combustion chamber, and a lever operable thereby; a nut mounted in trunnions in said lover; a stem for the regulating valve having a threaded engagement with the nut; and means for manually adjusting the regulating valve.

In testimony whereof I have hereunto signed my name in the presence of subscribing witnesses.

CHARLES FREMONT CURREY.

Witnesses:
JOHN A. HULIT,
Z. T. FISHER.